J. H. WARNER.
PIVOT BEARING CONSTRUCTION.
APPLICATION FILED JAN. 15, 1920.
1,368,670.    Patented Feb. 15, 1921.
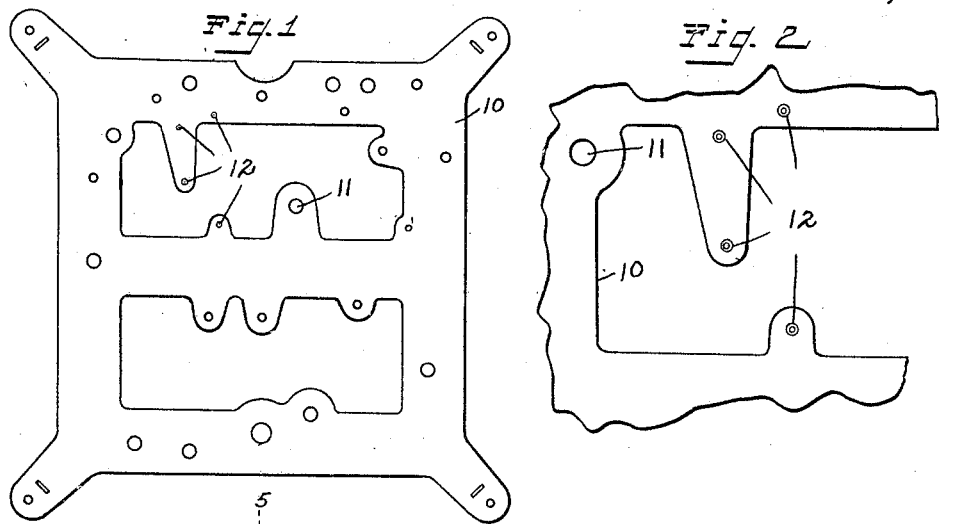
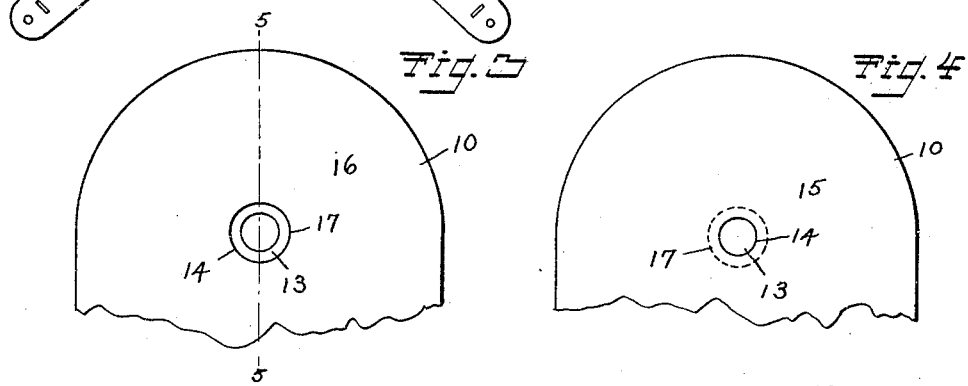
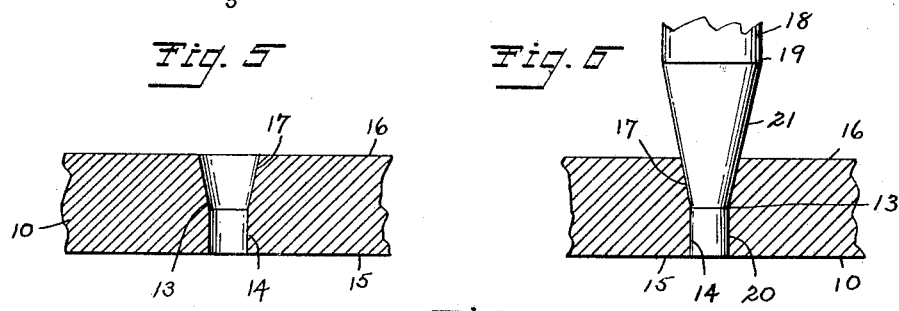
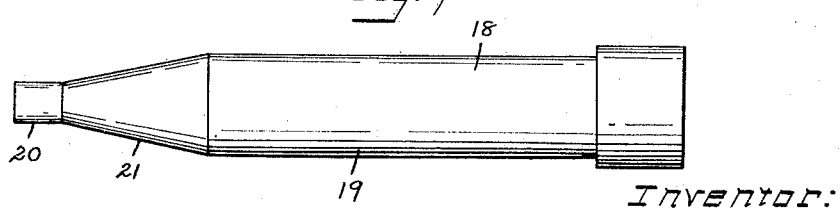
Inventor:
Julius Hills Warner.
By Louis M. Schmidt
Atty.

UNITED STATES PATENT OFFICE.

JULIUS HILLS WARNER, OF FORESTVILLE, CONNECTICUT, ASSIGNOR TO THE SESSIONS CLOCK COMPANY, OF FORESTVILLE, CONNECTICUT, A CORPORATION.

PIVOT-BEARING CONSTRUCTION.

1,368,670.  Specification of Letters Patent.  Patented Feb. 15, 1921.

Application filed January 15, 1920. Serial No. 351,659.

*To all whom it may concern:*

Be it known that I, JULIUS HILLS WARNER, a citizen of the United States, residing at Forestville, in the county of Hartford and State of Connecticut, have invented certain new and useful Improvements in Pivot-Bearing Construction, of which the following is a specification.

My invention relates to improvements in pivot bearing construction, having reference primarily to certain bearings that are provided in the movement plates for clocks for the pivots for the parts that have a relatively high or rapid rate of movement, such as the escapement parts, and which, because of such rate of movement, have usually received special attention in one way or another, and generally differ in detail from the the construction of the bearings of the other, relatively slow-moving parts, and the object of my improvement is to produce a movement plate in which these particular bearings are produced by a special mechanical process, and by the use of a tool of novel form, so that they are formed in a novel and special manner, and, at the same time, differ from corresponding bearings that are in common use only in a small or minor feature, involving simply a matter of degree, so that they are operative substantially in the same manner.

In the accompanying drawing:—

Figure 1 is a plan view of a movement plate for a clock that is provided with pivot bearings for the escapement parts that are made according to my invention.

Fig. 2 is a similar view of part of the same and on an enlarged scale, showing the parts that have the said pivot bearings, there being four such bearings.

Fig. 3 is a similar view and on a still further and considerably enlarged scale, showing a part of the plate with only one such pivot bearing.

Fig. 4 is a view of the same as viewed from the opposite side.

Fig. 5 is a sectional view on the line 5—5 of Fig. 3.

Fig. 6 is a similar sectional view, showing the operating tool in the final position for forming the bearing.

Fig. 7 is a side elevation of the said tool, being in the form of a combination tool, having a punch portion for forming the bearing proper and an enlarged portion with a tapered periphery at the supporting end of the said punch portion for forming the oil aperture.

The movement plate 10 shown in the drawing represents a form of structure that is in common use for clocks, has a plurality of pivot bearings 11 of ordinary form for the slow moving parts, being generally in the form of a simple cylindrical hole that is formed by drilling or punching, and also has a set of pivot bearings 12 of special form for the escapement parts, there being four such holes in the plate 10 shown, and these are formed in a special manner to be described.

The parts operating in the special bearings 12 are of relatively light weight and quick moving and it is usual to provide for these parts a bearing structure in the form of a perforation 13 through the plate 10 and which is composed of two parts, respectively a cylindrical part 14 that opens inwardly on the inner face 15 of the plate 10 and which serves as the bearing proper, and on the outer side, opening on the outer face 16 of the plate 10 an enlarged part, 17, generally of tapered form for the side walls or of the form of a countersink, that merges with the bearing proper 14 and serves as an oil well.

These features mentioned are retained in the present structure in a general way, and by departing from the usual construction in certain details I am enabled to form these special bearings in a more expeditious and economical manner, involving the use of my improved process and the special tool used therein.

One way of forming the special pivot bearings under consideration is to first drill or punch the hole for the bearing proper, then drill to form the countersink for the oil well, and finally ream out the bearing proper, involving removing the bur and obstruction produced by the countersinking operation. Thus three operations are involved.

By my invention the equivalent result is obtained in one operation by the use of the special perforating tool 18.

The tool 18 comprises the shank portion 19 at the holding or supporting end, has the reduced, cylindrical tip 20 at the free end, and intermediate the said shank portion 19 and tip 20, and merging with these parts, is the tapered or conical portion 21.

The tip 20 is of suitable diameter and length to form the bearing proper 14 and the enlargement 21 corresponds in dimensions and in the angle of the taper to the well 17. As an example of suitable operating conditions:—

The plate 10 may be of brass and have a thickness of 0.057 inches and under these conditions the length of the bearing proper 14 might be about 0.025 inches, the remainder of the thickness of the material of the plate being used for the well 17, and the taper of the side wall of the well would be approximately fifteen degrees relatively to the axis.

The usual taper for a well formed by a countersink is about forty-five degrees and the depth is usually appreciably less than the depth of the well given above, being less than one-half the thickness of the plate.

Thus the well provided is more elongated than usual and has a less flaring mouth, and is therefore better adapted for use in storing oil that is applied to the bearing.

The tip 20 is relatively short and is backed up by the enlargement 21, so that the tool 18 is adapted to stand up well under the conditions of use.

The metal in line with the tip 20 is the only metal that is removed in forming the aperture 13, and the well is formed by forcing outwardly the metal that is opposed to the enlargement 21, and the displacement of the metal is so slight as to have no appreciable disturbing effect.

Thus the bearing proper is formed essentially by punching out material of the plate and the well is formed by swaging the adjacent material.

I claim as my invention:—

The process of forming pivot bearing apertures in movement plates for clocks composed of a cylindrical bearing at one end and an enlargement in the form of an oil well at the other end comprising operating on the same plate in one operation by means of a single tool so as to punch out material for the said cylindrical bearing and swaging outwardly material for forming the border walls of the said well.

JULIUS HILLS WARNER.